June 8, 1926.  
F. L. LIPCOT  
1,588,245  
HOUSING FOR CUSHION CONNECTIONS FOR VEHICLE CONSTRUCTION  
Filed August 24, 1923

INVENTOR  
Fred L. Lipcot  
BY  
Redding, Greeley, O'Shea & Campbell  
ATTORNEYS Patented June 8, 1926.

1,588,245

UNITED STATES PATENT OFFICE.

FRED L. LIPCOT, OF NEW YORK, N. Y., ASSIGNOR TO RUBBER SHOCK INSULATOR COMPANY, INC., OF NEW YORK, N. Y., A CORPORATION OF DELAWARE.

HOUSING FOR CUSHION CONNECTIONS FOR VEHICLE CONSTRUCTION.

Application filed August 24, 1923. Serial No. 859,052.

This invention relates to housings suitable for use in the type of cushion connection for vehicle construction disclosed in Letters Patent of the United States No. 1,404,876 dated January 31, 1922. It has for its principal object to simplify, cheapen and standardize such housings to the end that they may, to a considerable degree, be interchangeable when used for given purposes as, for instance, in the connection between the ends of vehicle springs and the frame. The invention is not to be limited to the degree of interchangeability effected although it is conceivable that a single standardized housing might be constructed for association with either end of any one of the four or more suspension springs used in vehicle construction.

In accordance with the invention it is proposed to make the housing proper as a metal stamping as, for instance, from sheet steel and to secure the housing proper to an appropriate bracket or other supporting member which itself is to be united with the frame. It may be feasible to make the supporting brackets of a form adaptable for the particular location employed and to provide for the association of any form of bracket with the improved housing although in some circumstances it is understood that it may be more practical from a manufacturing and commercial standpoint to standardize the housings only with respect to certain forms of brackets. In the embodiment illustrated in the accompanying drawing, for instance, it is proposed to have the supporting brackets for the front ends of the front springs and the rear ends of the rear springs interchangeable and the housings attached thereto interchangeable and, likewise, the housings attached to the supporting bracket for the front ends of the rear springs interchangeable with the first named housings although the brackets for the rear ends of the front springs and the front ends of the rear springs may not be interchangeable nor the housings therefor. While this illustrates the results sought broadly to be obtained the invention is not to be limited to the particular degree of interchangeability found advisable for any given purposes.

Reference is now to be had to the accompanying drawings for a description of a suitable embodiment of the invention wherein.

As the description proceeds it will be understood that reference is had for convenience to such parts as are employed at only one side of the vehicle frame although it is within the skill of a mechanic to design such parts in such manner as to be interchangeable with respect to both sides of the vehicle frame. Such universal interchangeability, however, will not be found commercial ordinarily because of peculiar requirements of association necessarily obtainable between the frame member of the chassis and the right and left-hand brackets secured thereto.

Figure 1:
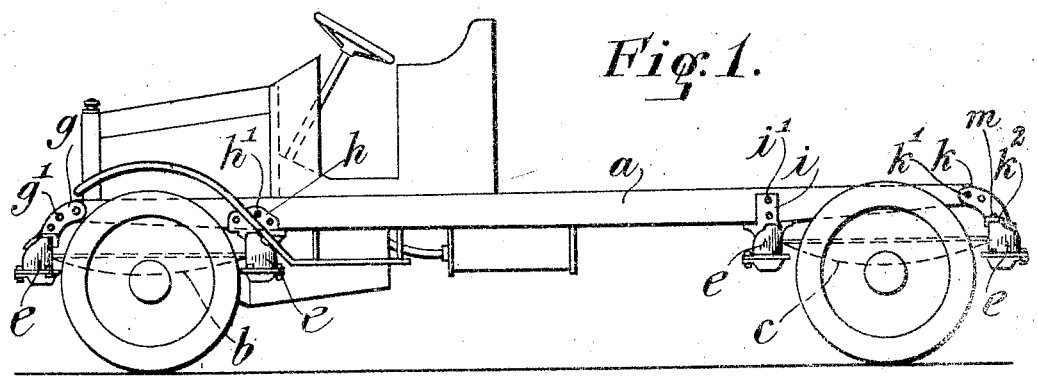
Figure 1 is a view in side elevation of a conventional motor vehicle chassis showing the improved housing associated with the ends of the vehicle springs and the frame members.
Figure 2:
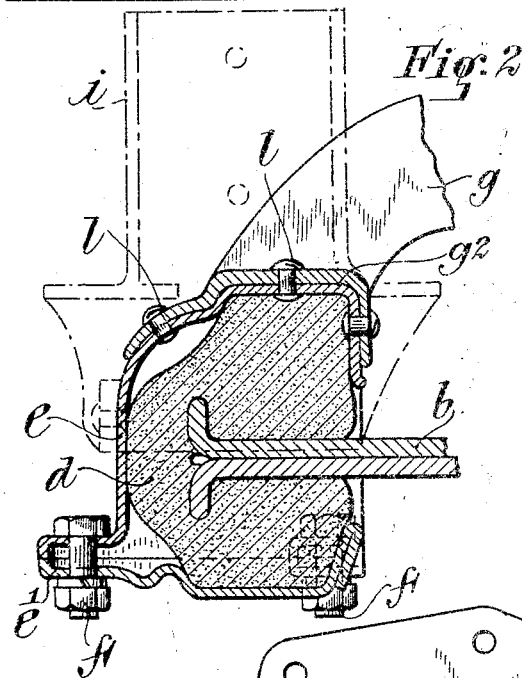
Figure 2 is a view of a fragment of the front spring horn showing in vertical section the improved housing secured thereto and, in dotted lines, the relation of a similar housing to the supporting bracket for the front end of the left-hand rear spring.
Figure 3:
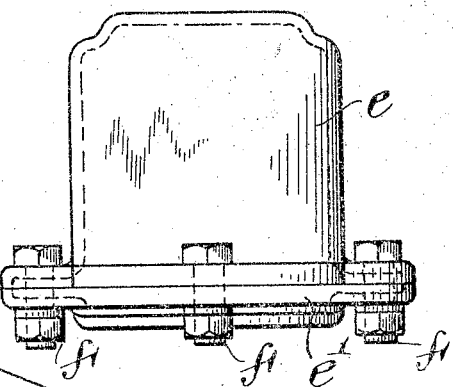
Figure 3 is a view in end elevation of the improved housing, the supporting unit therefor being omitted.
Figure 4:
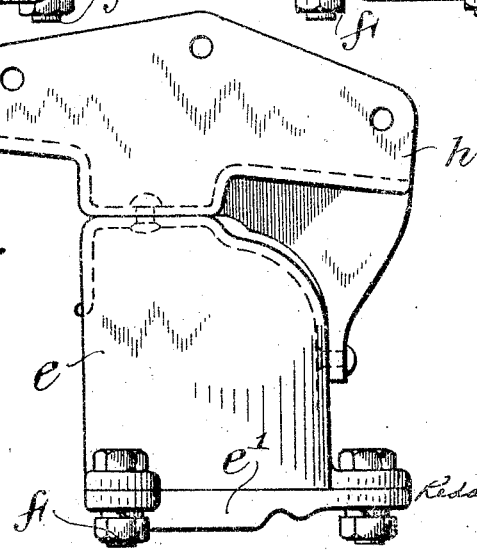
Figure 4 is a view in elevation of the improved housing attached to a supporting bracket at the rear end of the left-hand front spring.

In the drawings the left-hand side frame member $a$ of the chassis of the motor vehicle indicated is supported from front and rear springs $b$, $c$, which have their ends connected thereto through cushion connections of the character disclosed in Letters Patent of the United States No. 1,404,876. As indicated in Figure 2, for instance, the front end of the front spring $b$ is seated within a non-metallic mass $d$ such as a rubber block which itself is confined within a housing $e$ connected fixedly to the side frame member $a$. The present invention is concerned with the improvement of the housing with respect to manufacturing and assemblying requirements whereby lightness, cheapness and facility in assemblying are insured. The housing proper is preferably stamped out of sheet metal and comprises a box portion $e$ having an open side to receive the end of the spring $b$ and a closing cap $e'$ which may be bolted to the box $e$ as by bolts $f$. Suitable seats for the cushion mass $d$ may be stamped in the box $e$ and in the cap $e'$ as will be understood. It is desired, in accordance with the present invention, in so far as is practical, to standardize the form and size of the housings for association with the ends of the various springs of a vehicle. This may be accomplished to a substantial degree by providing supporting brackets as indicated at $g$, $h$, $i$ and $k$ for the housings which are so formed as to be attachable to the vehicle frame at the particular location desired. These brackets may themselves be also stamped out of sheet metal or may be cast, as may be preferred, and while best adapted for securing to the frame at a particular location as by means of bolts $g'$, $h'$, $i'$, $k'$, respectively, or the like, present, usually on their underside, a surface of such configuration as will facilitate the attachment thereto of the housing heretofore described. For instance, the front and rear spring horns $g$, $k$, may be formed on their lower surfaces similarly to the upper surface of the housing as indicated at $g^2$, $k^2$, and thus receive the housing snugly for attachment as by means of rivets $l$, $m$, respectively, or other suitable securing means. The brackets $h$ and $i$ are likewise formed on their lower surfaces with engaging parts adapted to facilitate the attachment thereto of the housing $e$ in like manner.

From the description given it will be understood that a substantial degree of simplicity and interchangeability is attended by the present improvements although the invention is not to be limited to the mere extent of interchangeability secured in a given assembly job. The application illustrates a construction in which all of the housings are interchangeable even as to the right and left-hand side frame members of the chassis, front and rear spring horns are interchangeable at opposite ends of the side frame members but only with respect to opposite side frame members, and the brackets at the rear ends of the front springs and the front ends of the rear springs are interchangeable except in so far as they might be assembled on the opposite side frame members.

It is to be understood that the invention is not to be avoided by giving to the parts a greater or less degree of interchangeability so long as the advantageous results described herein are effected by housings which are substantially similar or if some degree of interchangeability with dissimilar housings is provided for.

What I claim is:

1. In motor vehicle construction, in combination, a plurality of cushion connections interposed operatively between supporting members and a member to be supported and interchangeable housings for the connections.

2. In vehicle construction, in combination with a chassis frame and supporting spring, cushion connections of non-metallic yielding material interposed operatively therebetween, housings for said cushion connections open on one side to receive the ends of the spring and separate brackets secured to the housings and to the frame.

3. In vehicle construction, in combination with a chassis frame and supporting springs, cushion connections of non-metallic yielding material operatively interposed between the springs and the frame retained in housings open at one side to receive the ends of the springs and of such construction as to be adapted to be applied at either end of any of the springs, separate supporting brackets for the housings adapted to be connected to the frame to support said housings in proper relation, respectively, to the spring ends, and complementary engaging surfaces on the housings and on the brackets for intimate engagement therebetween.

4. In combination, two interchangeable housings to retain cushion connections of non-metallic yielding material comprising a stamped sheet metal box to receive the cushion connections, a stamped sheet metal cap adapted to be secured to the box to confine the cushion mass, interchangeable brackets for connection to the vehicle frame having surfaces to engage intimately with the exterior surface of the housings, and means to connect the housings to the brackets along said engaging surfaces.

5. In combination, two interchangeable housings to retain cushion connections of non-metallic yielding material having their exterior surfaces formed irregularly to conform with the shape of the cushion connections, interchangeable brackets for connection with the vehicle frame having surfaces to engage intimately with complementary exterior surfaces of the housings, and means to connect the housings to the brackets along said engaging surfaces.

This specification signed this 16 day of August A. D. 1923.

FRED L. LIPCOT.